United States Patent [19]

Moore

[11] Patent Number: 5,528,759
[45] Date of Patent: Jun. 18, 1996

[54] METHOD AND APPARATUS FOR CORRELATING NETWORK MANAGEMENT REPORT MESSAGES

[75] Inventor: Robert E. Moore, Durham, N.C.

[73] Assignee: International Business Machines Corporation, Armonk, N.Y.

[21] Appl. No.: 606,671

[22] Filed: Oct. 31, 1990

[51] Int. Cl.⁶ .......................... G06F 15/177; G06F 17/30
[52] U.S. Cl. ...................... 395/200.11; 395/600; 395/650; 340/825.06; 364/242.94; 364/284.3; 364/284.4; 364/DIG. 1
[58] Field of Search ..................... 395/800, 650, 395/600, 200.11; 340/825.06; 364/242.94, 284.3, 284.4

[56] References Cited

U.S. PATENT DOCUMENTS

| | | | |
|---|---|---|---|
| 4,550,278 | 10/1985 | Yamanaka | 318/632 |
| 4,823,345 | 4/1989 | Daniel et al. | 371/37.1 |
| 4,922,491 | 5/1990 | Coale | 395/183.02 |
| 4,965,772 | 10/1990 | Daniel et al. | 395/200.11 |
| 5,119,377 | 6/1992 | Cobb et al. | 395/183.14 |
| 5,119,493 | 6/1992 | Janis et al. | 395/650 |
| 5,121,475 | 6/1992 | Child et al. | 395/153 |
| 5,142,663 | 8/1992 | Janis et al. | 395/600 |

*Primary Examiner*—Thomas G. Black
*Assistant Examiner*—Jack M. Choules
*Attorney, Agent, or Firm*—John J. Timar; Edward H. Duffield

[57] ABSTRACT

Error or condition reporting messages known as "alerts" transmitted to a communication network management facility are correlated by including with each reporting message or alert a unique token having a length field, a key identifier field identifying the nature of the message and a data message field containing a unique n-byte pattern. Incoming reporting messages or alerts received at the communication network management facility are scanned for the existence of a reporting message correlation subvector and, if such a message is found, its token is extracted and compared against a list of previously received tokens to determine whether the reporting message concerns a facility or resource which has already been the subject of a previous report or alert. The inclusion of the length and key identifier fields in addition to the unique n-byte field to make up the token assures that correlation tokens generated under different communication protocols will not contain identical tokens.

7 Claims, 9 Drawing Sheets

| TOKEN | POINTERS TO MESSAGE RECORDS THAT CONTAIN THE TOKEN |
|---|---|
| T1 | P1 |
| T2 | P2, P3 |
| T3 | P4 |
| T4 | P5 |
| T5 | P6 |
| T6 | P7, P8 |

METHOD AND APPARATUS FOR CORRELATING NETWORK MANAGEMENT REPORT MESSAGES

FIELD OF THE INVENTION

This invention relates to network management systems and techniques in general and more particularly to means for correlating received network condition reporting messages to a single incident or entity. Specifically, multiple reports received from different network elements concerning the same event or entity may be gathered and related to one another at the receiver.

PRIOR ART

Currently available communication network management products such as IBM's NetView network management program utilize mechanisms for reporting and transporting network conditions, failures or problems. These mechanisms utilize the well-known and documented Network Management Vector Transport (NMVT) scheme. This scheme may be found in U.S. Pat. Nos. 4,823,345 and 4,965,772 which also may be found reported in the IBM Systems Journal, Vol. 27, No. 1, 1988, pages 15–30.

In this prior art scheme, no mechanism is provided for correlating multiple alerts or reporting messages pertaining to a single problem or condition. However, multiple reports will be generated, for example from two nodes at the ends of a communication link which would send alert messages reporting on certain types of link errors, each node reporting the error as viewed from its own vantage point in the network. In order for these multiple reporting messages to be most useful, some means of correlating them must be provided together at the receiving management system. The only mechanism available in the prior art is manual correlation by a human operator who recognizes incoming messages and is able to remember those which come regarding the same facility or resource or who has access to a list and can intelligently select from the list those reporting messages which relate to the same condition. There is value in the multiple reporting messages since each of the message senders may have useful information about a problem or condition that the other does not have access to or has not recognized. The value of these messages is greatly diminished when no mechanism is provided for correlating accurately any related messages since the human operator may not recognize the significance of the fact, or even the fact itself, that two or more reporting messages relate to the same problem or condition.

An automatic correlation mechanism is desired so that incoming reporting messages or alerts at a receiver can be presented to the system operator in a unified listing providing a single view of the problem or condition being reported upon.

OBJECTS OF THE INVENTION

In view of the foregoing known difficulties in the prior art network reporting scheme, an object of this invention is to provide an improved alert reporting system in which correlation token mechanisms provide for correlation of related messages about a given condition or problem.

Yet another object of the invention is to provide an improved correlation technique that does not require modification of the message receiver or management system such as by adding new code point definitions or the like when new classes of messages or alert reports are added.

BRIEF SUMMARY OF THE INVENTION

A general mechanism is provided that allows the network management facility receiver to correlate two or more related condition reporting messages that pertain to a single incident or event. Before any messages reporting on a problem are sent, and indeed before any problems are detected, the would-be senders involved in sending alert or reporting messages according to the invention must coordinate between themselves the generation of a unique correlation token that will be included with their reporting messages. Each reporting message sender is provided with a means for generating n-bytes of data in a pattern guaranteed to be unique, and means for appending to the data pattern identifying fields. The identifying fields are the length of the token and a key indicator indicating the nature of the data as a token. The existing network management architecture data encoding and the transport architecture of the prior art known as the Network Management Vector Transport (NMVT) is retained, but a special management service unit correlation subvector, including the correlation token which is unique is employed to allow the message receiver to correlate an incoming problem report or error alert with other reports on the same incident that may have been received earlier. Including the key identifier byte or bytes together with the length field and the unique n-bytes of data to comprise a token eliminates the possibility of accidental matches occurring between tokens of different types.

Each potential reporting sender node in a connection is provided with a unique token having an n-byte value, a token length field and a key identifying sub-field. All of these fields taken together comprise a unique correlation token, guaranteed not to be duplicated within the network regardless of the communication protocols or formats employed. By "connection" as used herein is meant the defined path and elements constituting the route by which defined end point nodes communicate with one another.

The connection exists between two nodes and may comprise a number of intervening nodes and communication facilities. In the preferred embodiment the node which assumes the primary responsibility for the establishment of the connection, i.e. for creating the desired session, is responsible for: (1) generating a unique number of n-bytes to be used for correlation and (2) for communicating this number to the other nodes in the connection that will be involved in the communications path. The technique used for generating the unique n-byte number may be any of a number of previously known well-defined algorithms, but a preferred embodiment utilizing the known PCID generation technique is employed in the preferred embodiment.

BRIEF DESCRIPTION OF DRAWINGS

The invention will be described with reference to a preferred embodiment thereof which is further described and illustrated in the drawings in which.

DESCRIPTION OF PREFERRED EMBODIMENT

In order to correlate a plurality of reporting messages or alerts involving a given resource in a network having a network management resource and a plurality of managed elements or resources, it is necessary to provide for correlation of the messages at a level of time granularity that does not contain either too many reports, for example all reports generated regarding a given resource over its entire lifetime, or providing a report that is too fine in correlation, such as per report or alert. Correlation of all reports over the lifetime of a resource is already provided in the prior art by the hierarchical vectors and subvectors encoded according to the noted standards referred to earlier. However, when a human operator wishes to see all the data about a particular instance or failure in a resource, it is not useful to display the entire history of data associated with prior, subsequent or related failures for the same resource. A mechanism for retrieving all the records and only those relating to a specific instance regarding that resource is what is desired.

At the other end of the spectrum, too finely correlated a set of reports is also not useful. For example, when multiple reporting messages or alerts from multiple senders relating to a single fact or failure in a single resource are generated, if they were correlated only by alerts, there would be no way for gathering the related alert messages together for display.

The proper and desired level of correlation granularity over time would be preferably that all reports or messages generated about a given resource during a defined resource "instance", i.e. such as a SNA "session" which is a defined to exist between known end points over a known path comprising known network nodes by names. A "session" comes into existence by defining that communication is to occur between the two end points and exists for the duration in which the communication passes and is desired and then ceases. This is an "instance" of a resource defined to include the end points or nodes which desire to communicate with one another and the intermediate nodes or points over which their message may be carried.

Figure 1:
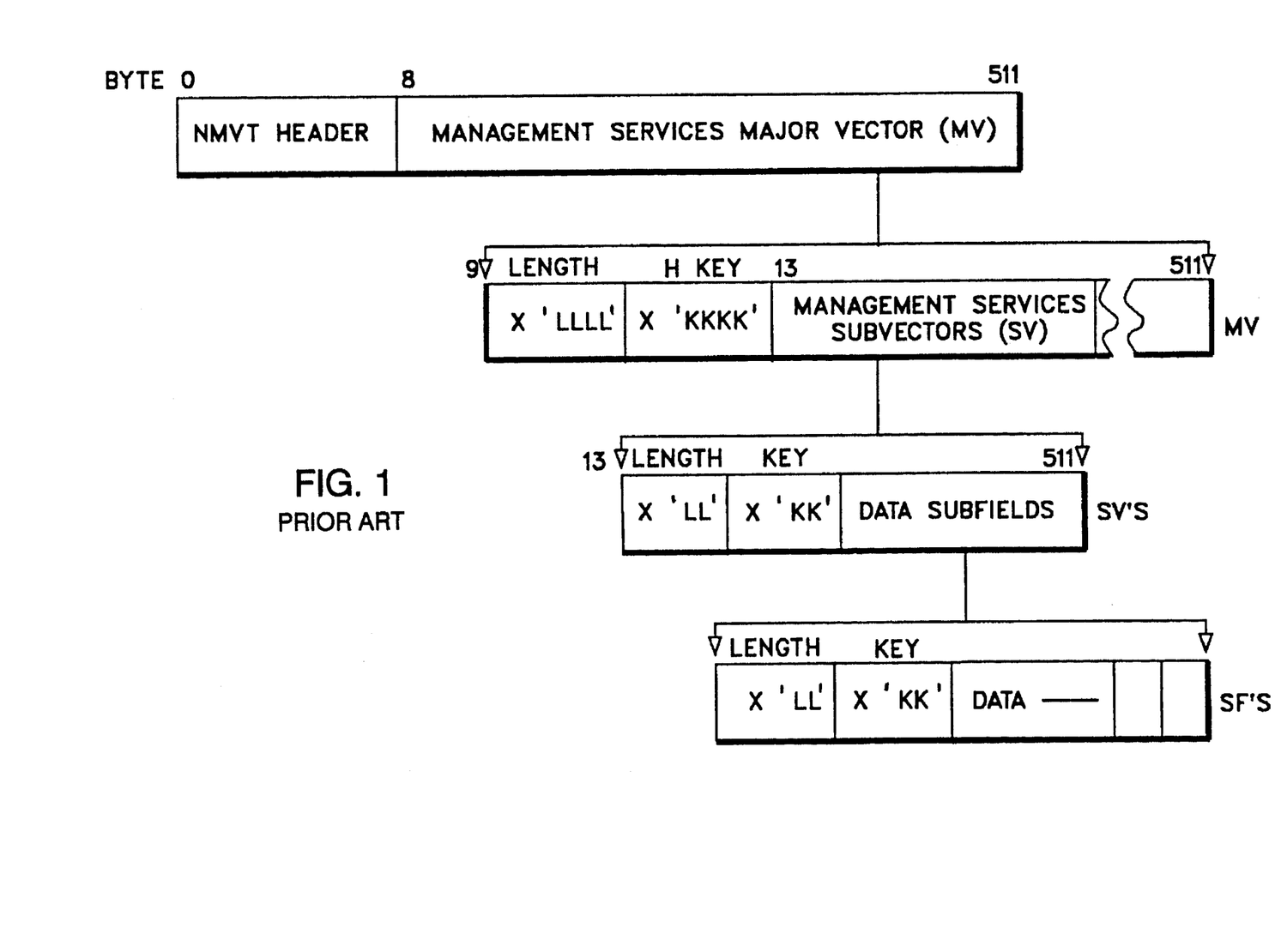
FIG. 1 illustrates the prior art Management Services Major Vector message format employed in the present invention.

In the preferred embodiment of the invention described now, use is made of the known NMVT including the Management Services Major Vector/subvector/subfield format known in the prior art and shown in the US Patents noted above. FIG. 1 illustrates this message format scheme which can be employed in any communications protocol or signaling technique. The illustration is for Systems Network Architecture (SNA), but it is equally valid for Integrated Services Digital Network (ISDN) communication protocols and encodings, or others, as well as for correlation of multiple reports concerning non-communication resources, e.g., shared DASD. That is, it is the structure, the sequence of fields and their contents, that are important.

Figure 2:
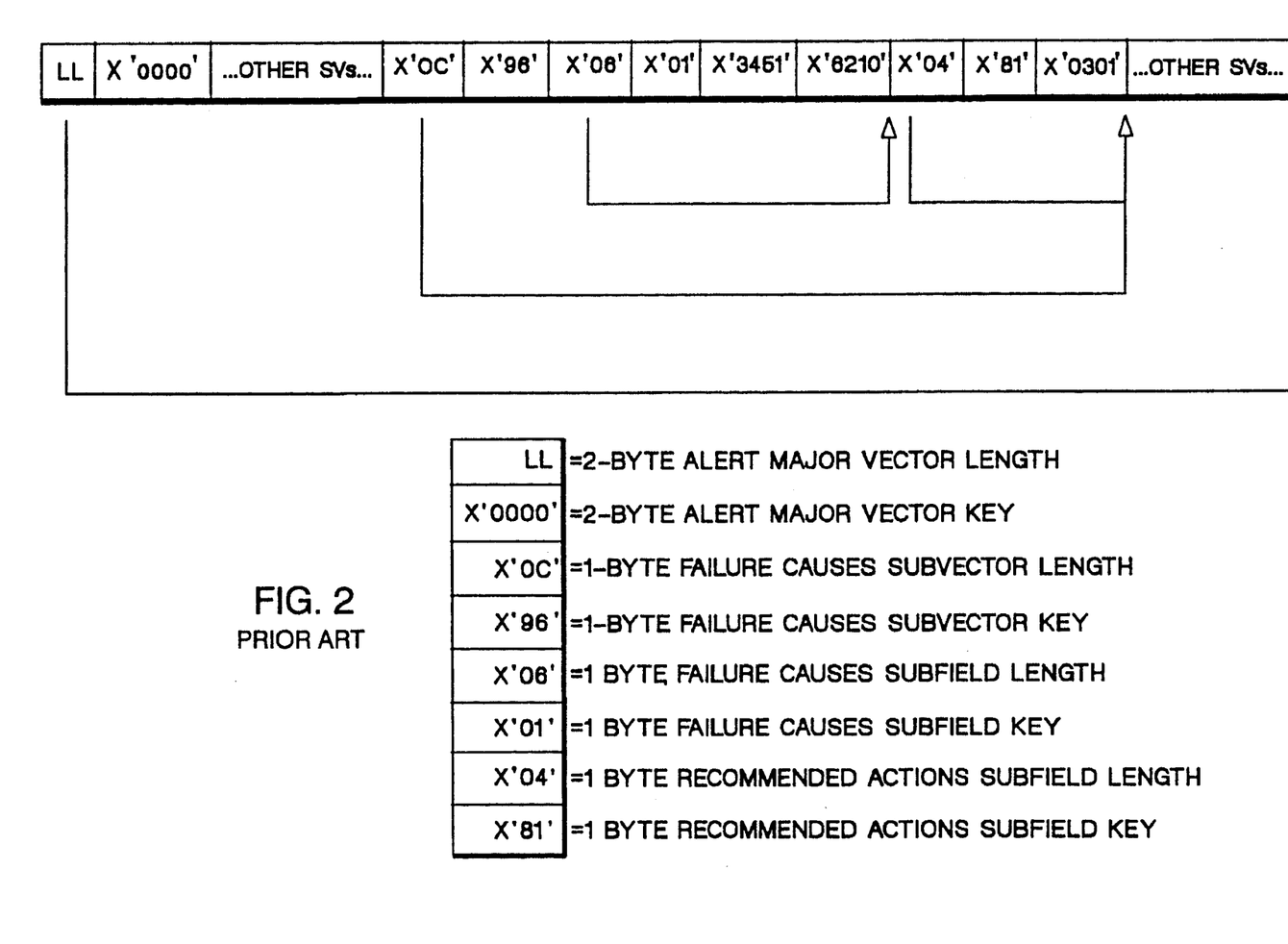
FIG. 2 illustrates an example showing how prior art index code points may be carried in an alert message major vector containing subvectors and subfields.

FIG. 2 illustrates a more detailed example as known in the prior art such as shown in FIG. 1 in which a reporting message, i.e. an alert major vector, has an incidence of a management services major vector from FIG. 1. It will be noticed in FIG. 2 that the prior art major vector transport format includes: the major vector length field, a major vector key identifier (identifying the vector as one containing a reporting message or alert), a failure cause subvector length field and a failure cause subvector key together with recommended action subfield length and subfield key and data fields supplying information regarding the failure or other condition or cause being reported upon. All of this structure is described and illustrated in much greater detail in the IBM Systems Journal, Vol. 27, No. 1, 1988, pages 15–30 which is available from IBM by ordering reprint #G321-5308.

As is also known in the prior art, when nodes in a communication network wish to establish a connection for exchanging or receiving messages or information, an exchange of identifications takes place which establishes the instance of the connection resource which is to be managed or reported upon. Each node has assigned to it at the installation thereof a network unique control point name or node name. It is also provided with a unique number generating method and apparatus that can generate an n-byte value guaranteed to be unique for all time that it is in existence. Many algorithms may be employed for such number generators, but one example known in the prior art and employed in networks of this type is detailed on pages 4–3 and 4–4 in the Systems Network Architecture Type 2.1 Node Reference available from IBM as Reference #SC30-3422-1, Copyright 1986, 1988 by International Business Machines Corporation.

Figure 3:
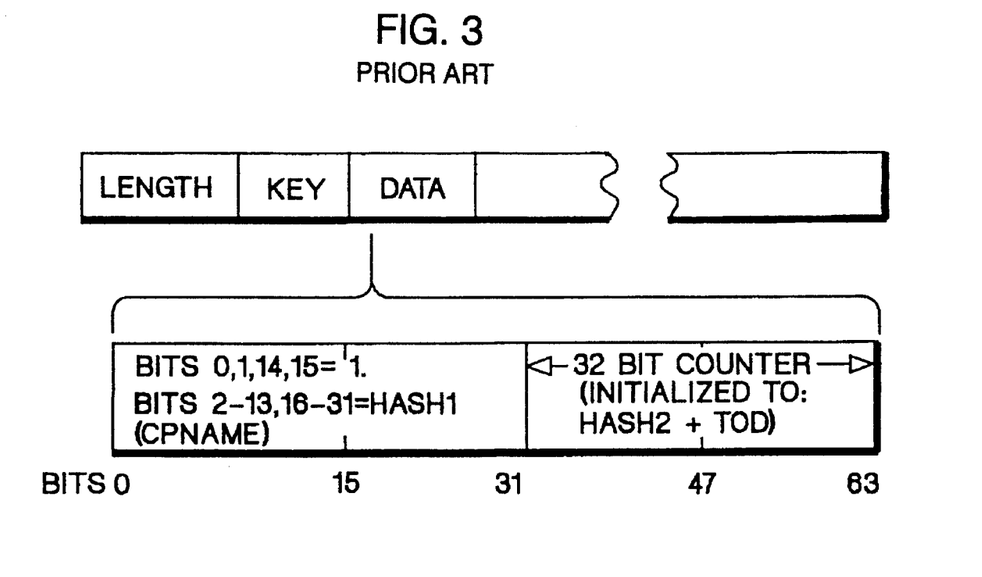
FIG. 3 illustrates one example of prior art generation of a unique n-byte field employed in the preferred embodiment of the invention.

FIG. 3 in this application is taken from the aforementioned Type 2.1 Node Reference and illustrates an example of an algorithm employed as noted therein for generating a unique 8-byte binary number known as the "Fully Qualified Procedure Control Identifier" or "FQPCID" or simply "PCID" for brevity.

The PCID is generated by an algorithm set forth in the aforementioned reference. Each node or resource contains a counter by which the PCID is incremented at the time of each session assignment request. The generation technique is fully described in the aforementioned reference, but briefly includes the hashing of the PCID counter. The hashing operation is a dividing of the first 64 bits of a string derived from the network identification and control point name for the originating control point by a 30 bit binary prime number, i.e. the decimal number 892,038,479 or hexidecimal 352B6D4F. Thirty bits of the remainder are computed, right aligned in the high order 4 bytes of the format shown in FIG. 3, and then bits 0, 1, 14 and 15 are forced to a 1 value. A second hash value is also generated by the same function except that it uses as a divisor a 31 bit prime number (2,119,403,551 in decimal or hexidecimal 7E53881F). The second hash result is added to a time of day clock value, but for nodes which do not have a suitable clock, the last value used is stored in safe memory over all initiation instances. The resulting low order 4 bytes for the PCID are incremented via a counter for each new instance of the PCID.

The dividend string used in computing the hash values is composed of the network ID and the CP name of the origin control point as described in the reference, but briefly includes:

The CP name itself is padded by adding zeroes or spaces on the right to make up an 8 byte long string of characters. Next the network identification assigned to the node is also padded on the right as needed with space characters to make an 8 byte string. Every 8 bit character in the resulting string is then rotated 2 bits to the left which shifts the two high order bits of each character, i.e. each string of 8 bits, into the low order positions in each byte. The two resulting binary strings are exclusively OR'ed together to produce the dividend which is used in the hash function to create a 64 bit binary number which is the PCID and is guaranteed to be unique over all the names and control points in the network as set forth in greater detail in the aforementioned reference.

The PCID generation technique is but one example of a prior art algorithm for generating a unique N-byte field of data which can be employed in the present invention in creating a preferred embodiment of a correlation token.

The process in the present invention is that at the exchange of network identifiers at the establishment of each connection, the node responsible for session establishment passes the PCID it created for the session to the other nodes in the connection.

The correlation token is created using rules which will guarantee that each node will use the same token for the link or session for which it is established. This is guaranteed by requiring that each node, in this detailed example, use the PCID and a length and a key identifier in a Management Services Major Vector format. This method guarantees uniqueness for the pattern so generated. To the PCID, each node also appends the length and key fields for the management services vector transport length and subfield keys for use in the management services unit correlation subvector constructed according to the example given in FIG. 2.

Figure 4:
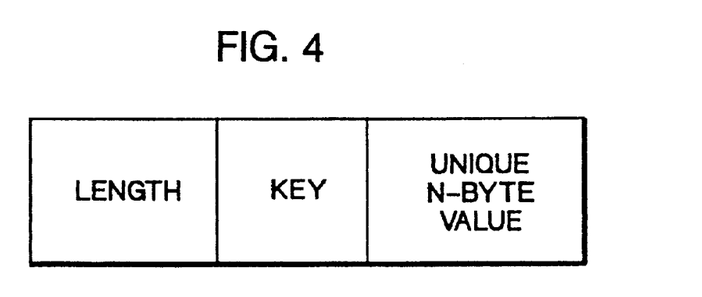
FIG. 4 illustrates the format and structure of a guaranteed unique number or byte sequence to be used for correlation of alert reports or messages relating to the same incident as reported by one or more reporting nodes within the network according to the present invention.

The result is shown in FIG. 4 where a unique token is shown to consist of a field giving the length of an overall token, the key value which is the subfield key for the SNA session correlation token in this example, and the n-byte value generated by the unique bit generator such as that previously described with reference to the prior art PCID identifier generation algorithm.

The token generation scheme is useful over many types of communication architecture connections and results in a unique token by which correlation of messages or alerts at a receiver therefore may be based upon pattern matching of the tokens included in the messages (by their senders).

Figure 5:
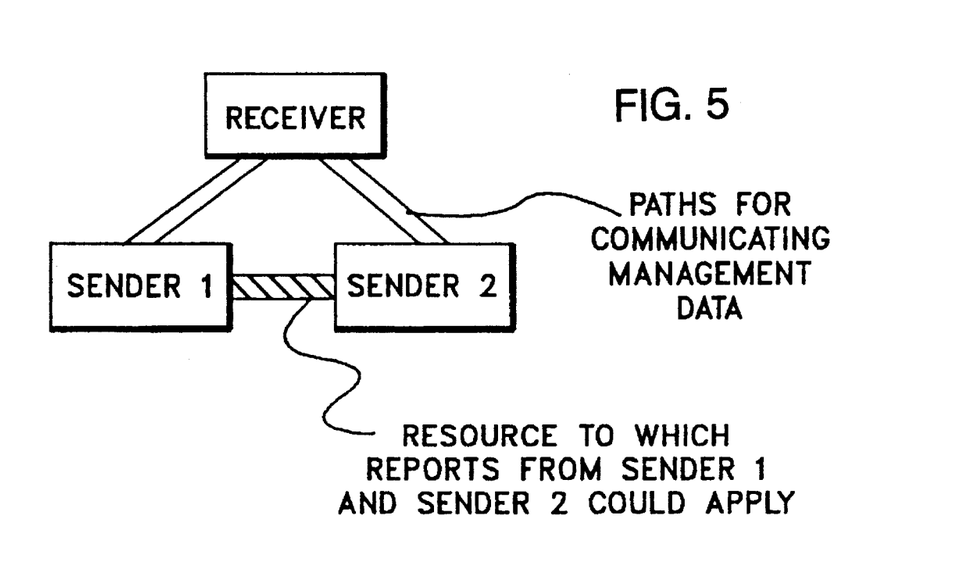
FIG. 5 illustrates schematically a simple communications network having a receiving management system for correlation of reports according to the preferred embodiment of the invention.

Turning to FIG. 5, the overall communication network having a receiver or network management control point interconnected via communications paths or facilities to two different senders, sender 1 and sender 2, which communicate with one another over another communication resource, is shown. The receiver or management resource will typically be a computer running a network management program such as the IBM Corporation's NetView product. The receiver includes the usual structures of a CPU for receiving, parsing and analyzing incoming data according to known formats and protocols. The receiver analyzes incoming messages to determine if they are alerts or reports and to determine whether a correlation subvector is included. If a correlation subvector is found in the incoming NMVT format, the token or tokens contained therein are extracted and loaded into a token table built under program control at the receiver. The table contains the token identifications and pointers pointing to the area in memory where the reporting messages have been stored.

Figure 6:
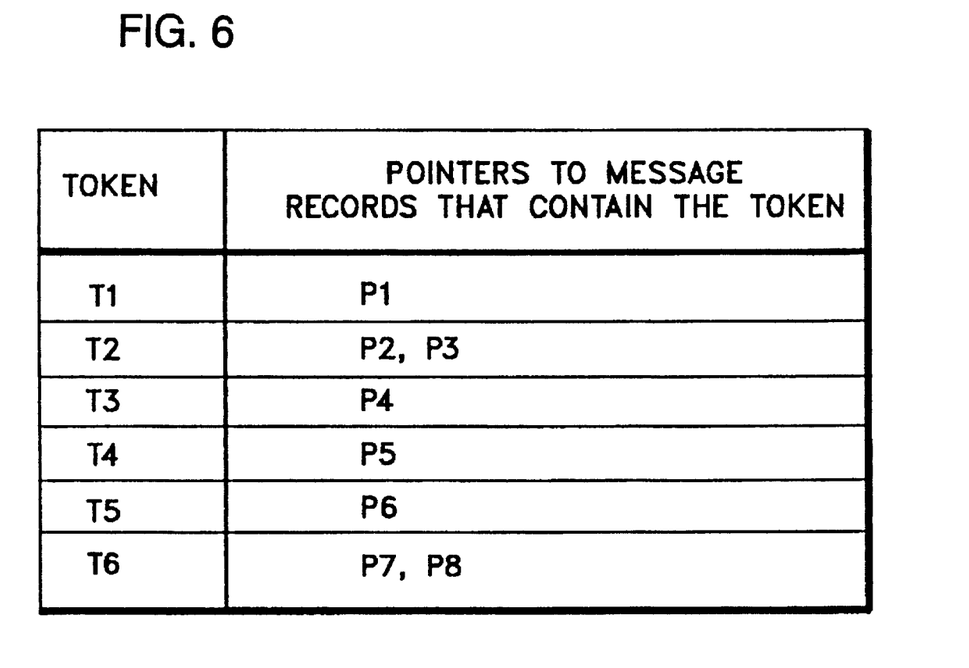
FIG. 6 illustrates a token correlation and pointer table as implemented in the preferred embodiment of the invention at the receiver.
Figure 6A:
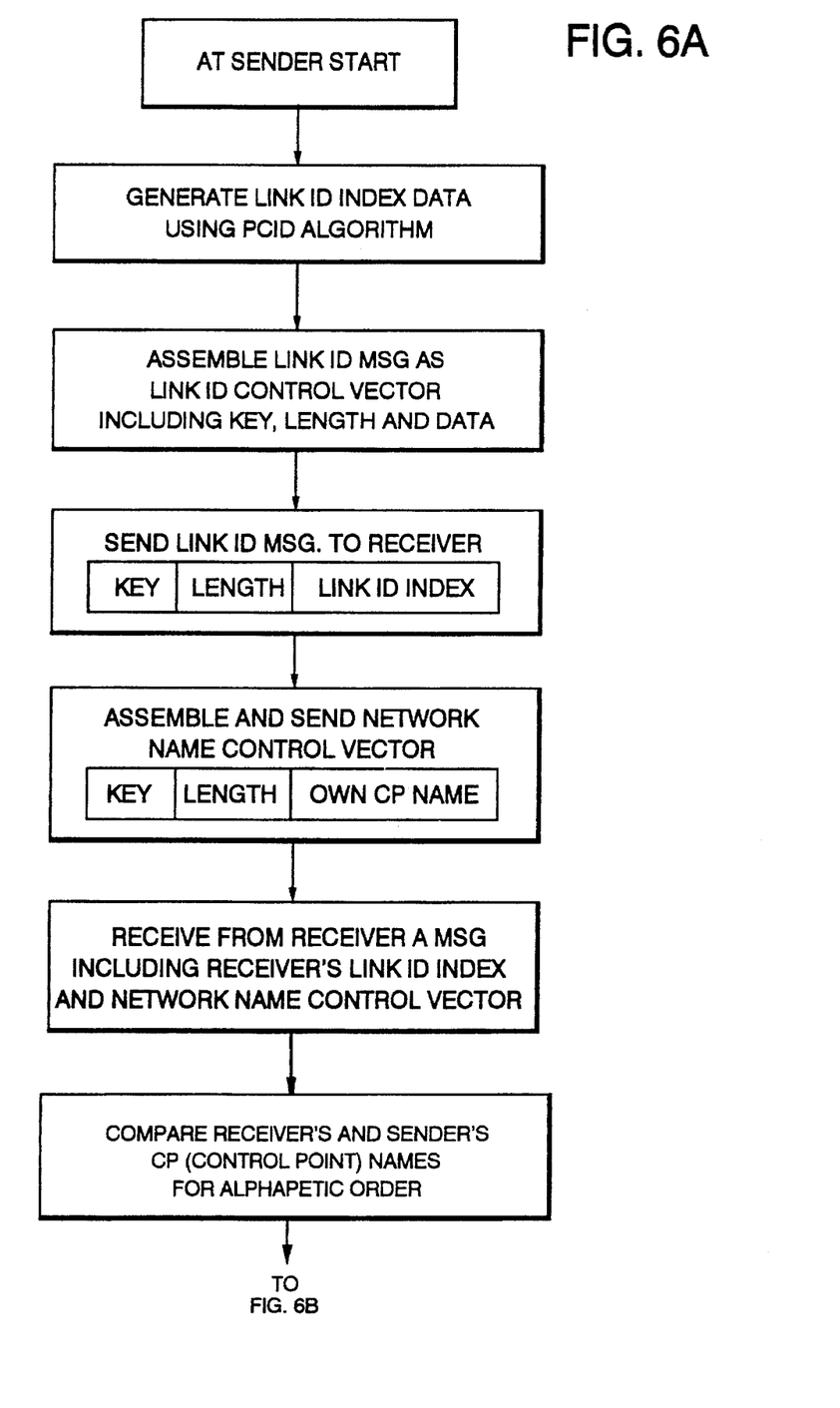
Figure 6B:
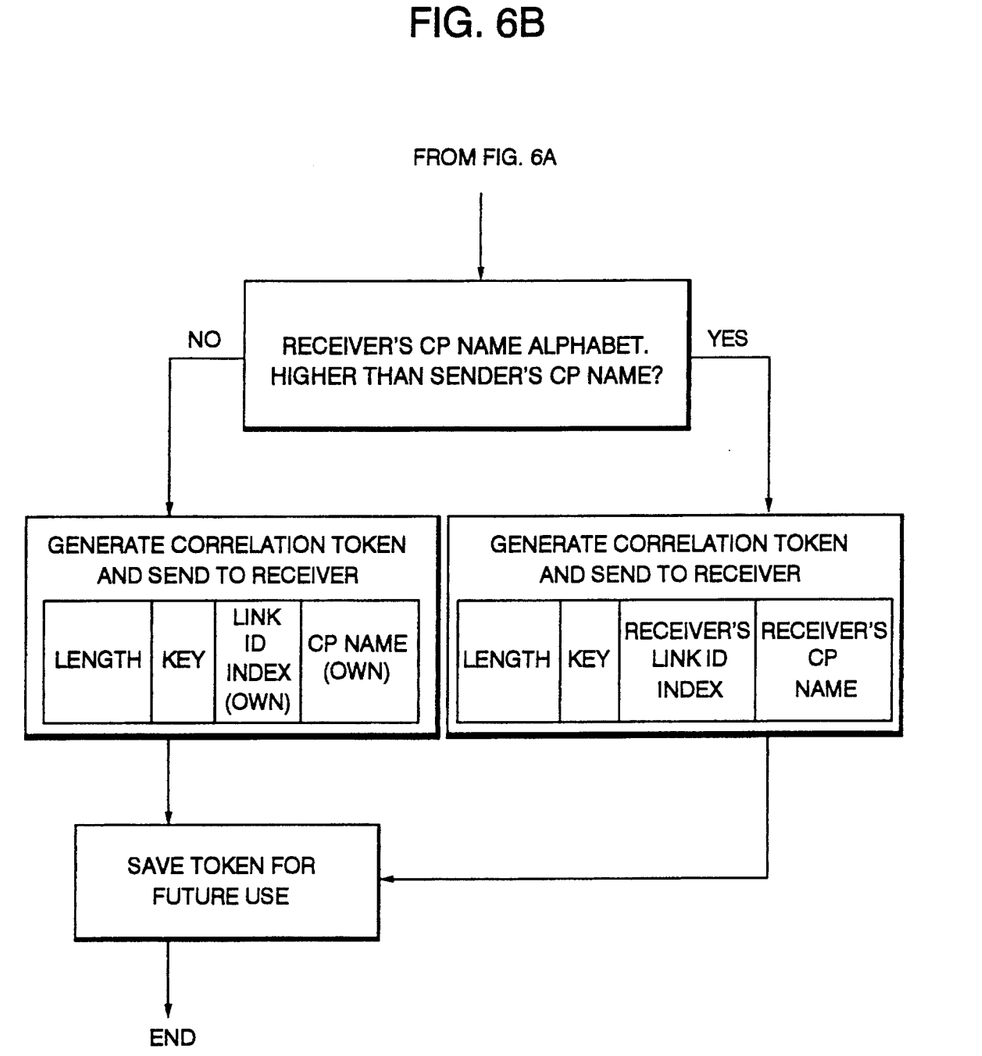
Figure 7A:
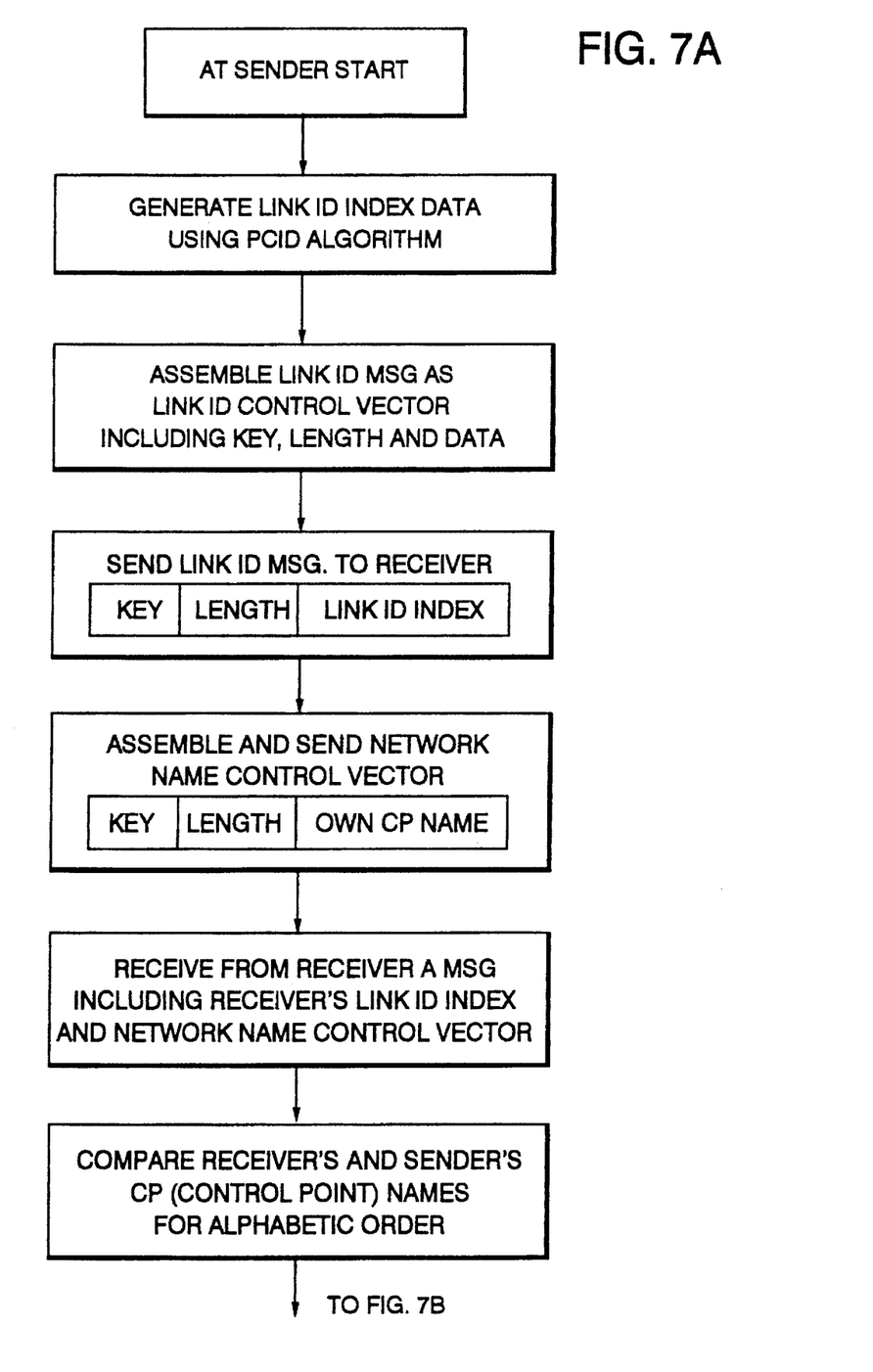
FIG. 7 illustrates the flow chart of a computer implemented process to be carried out at the sender stations as shown in FIG. 5 that results in the generation of a correlation token after exchange of messages by the receiver and the sender.
Figure 7B:
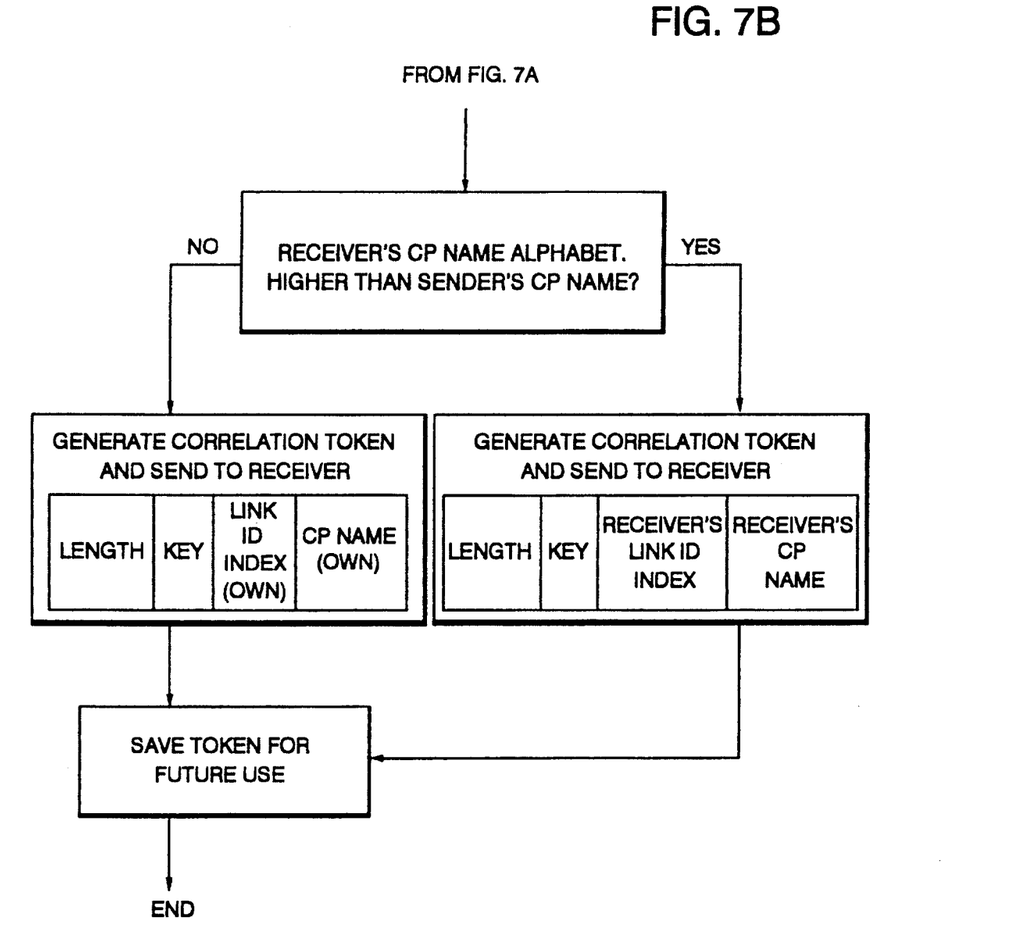
Figure 8:
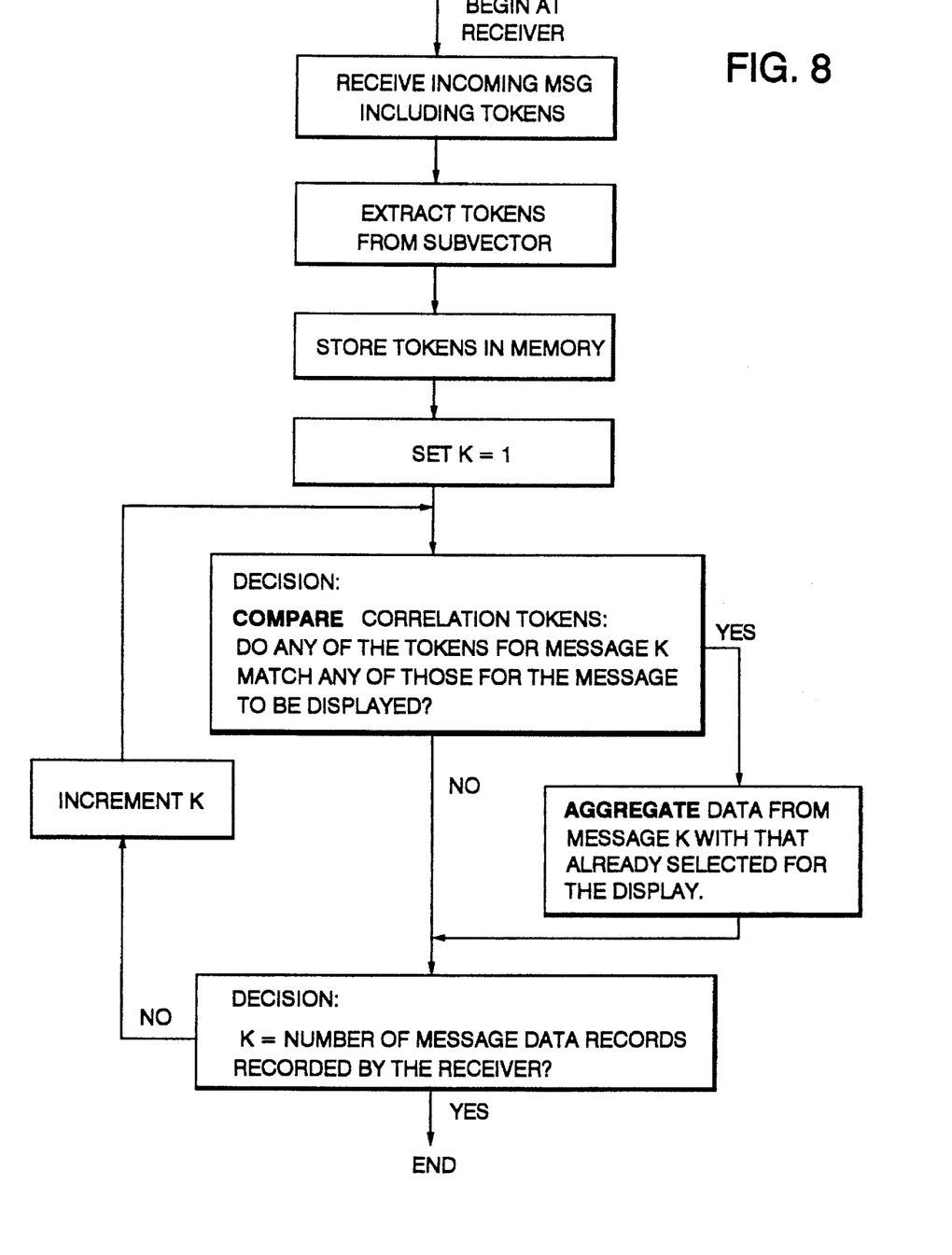
FIG. 8 illustrates a computer program flowchart for computer processes at the receiver for correlating alert messages together by aggregating data that come from independent messages having the same correlation token.

FIG. 6 illustrates a typical token pointer table to be used for correlation of incoming new alerts or messages. In FIG. 6, token $T_2$ has had two previous alerts as indicated by pointers $P_2$ and $P_3$ as has the token $T_6$ which has pointers to two different messages $P_7$ and $P_8$. The plural messages with the plural pointers are correlated for retrieval and display in this fashion.

When the receiver receives a new report, it logs the report by storing it in memory and retains a pointer $P_x$ to indicate where it was stored. The management program then extracts all correlation tokens that may exist in the report, searches the table as shown in FIG. 6 for a match, and if a match is found adds the pointer written for this incoming message to the list of pointers indicated for a token for which a match was found. If no match is found, then a new row is added to the table for the new token identification $T_i$ and its pointer to memory $P_x$. In this fashion, the system keeps track of all tokens received over a given session and correlates the multiple messages that may be received having the same token for display together at the human operators request or for further automated program actions as the case may be.

The procedures or protocols by which would-be senders may agree upon their unique correlation token for reporting their messages may vary for different kinds of networks or conditions. For SNA sessions such as those described above, the procedures involving the transfer of information and the exchange of identifiers takes place when the initial session is set up. For ISDN connections, adjacent product port identifications may be exchanged. All of this is to illustrate the fact that procedures for achieving agreement on adoption of a unique token may vary within a given type of network or architecture scheme but can be caused to result in generating the same token. This token may be employed for correlation recognition at a receiver without any changes being required to the receiver. The same method by which the receiver correlates multiple reporting messages or alerts may be extended without any change to correlation of other records. For example, the correlation of a data link control alert message with a supporting statistics record solicited by the network management facility from a target node or from a report of measured parameters or statistics can occur, as well as correlation of a reporting message with any subsequent problem management record which tracks steps taken in achieving resolution for the problem.

The definition of a format for the unique token that can be extended indefinitely at each sender without having any impact on the receivers is shown by this invention. It is accomplished by utilizing the subfield key as a portion of the token data rather than as an identifier merely for the type of data contained in the subfield. The key field will differ from an SNA link to an ISDN connection and vice versa, for example.

Therefore, what is desired to be protected by letters patent is set forth in the following claims by way of description only in which:

1. In a communications network having a network management resource computer and a plurality of managed resources and means for reporting, over communications facilities interconnecting said resources, conditions involving said managed resources to said management resource computer, program means for receiving and correlating reporting messages received, said program comprising:

means at said management resource computer for receiving, recording, and analyzing said reporting messages;

means for comparing an identifier token from each said reporting message with a record of any said identifier tokens contained in previously received reporting messages received and recorded at said management resource computer; and means for aggregating for display or recordation any said reporting messages found by said means for comparing to have matching identifier tokens as correlated messages concerning the same said managed resource.

2. In a communications network having a network management resource computer and a plurality of managed resources and means for sending, to said network management resource computer over communication facilities interconnecting all of said resources, reporting messages regarding conditions involving said managed resources, a method of correlating separately generated reporting messages received at said management resource computer comprising steps at said management resource computer of executing a program for:

receiving said reporting messages at said management resource;

comparing an identifier token in each received reporting message with a record of any said identifier tokens contained in reporting messages previously received by said management resource computer, and aggregating for display or recordation any said reporting messages found by executing of a comparison program to have matching identifier tokens as correlated messages concerning said managed resource identified by said identifier tokens.

3. A method of executing a program as described in claim 2 further comprising a step of generating said reporting messages and including a step of:

concatenating to said identifier token a message length field and a subfield key identifier from an SNA management services network management vector transport format.

4. In a communications network having a network management resource computer, a plurality of managed resources, and computer means for reporting via reporting messages sent, over communications facilities interconnecting all of said computers and resources, conditions involving said managed resources to said management resource computer, a computer implemented method of correlating separately generated reporting messages received at said management resource computer, said reporting messages conveying information concerning a circumstance or condition existing at or relating to a given said managed resource in said communications network comprising computer implemented steps of:

generating an identifier token, said token being unique to said managed resource and generated by execution of a computer implemented token generation program;

generating via execution of a message formatting computer program a reporting message identifying a specific circumstance or condition relating to said managed resource, said reporting message including said identifier token;

transmitting said reporting message to said management resource computer through said communications network;

receiving said reporting message at said management resource computer;

recording said message and said token in a data record maintained by said management resource computer;

comparing via execution of a comparison program said identifier token with said record of said identifier tokens in reporting messages previously received by said management resource computer; and aggregating for display or recordation any said reporting messages found by said comparison program to have matching said identifier tokens, thereby correlating said messages as concerning the same said managed resource.

5. The method of claim 4, wherein said generating of said identifier token further comprises a step of:

concatenating to said identifier token a message length field and a sub-field key identifier from an SNA management services network management vector transport format.

6. A system for correlating separately generated reporting messages received at a management resource computer in a communications network having both a management resource computer and a plurality of managed resources, said resources having computer means for reporting, over communications facilities interconnecting all of said resources, conditions involving said managed resources to said management resource computer, said system comprising:

means for generating an identifier token unique to each said resource being managed;

means for generating a report message identifying a specific circumstance or condition relating to said managed resource and including therein said identifier token;

means for transmitting said reporting message including said identifier token to said management resource computer through said communications network;

means for receiving said reporting message at said management resource computer;

means for recording said message and said identifier token in a data record managed by said management resource computer;

means for comparing said identifier token with said record of identifier tokens in reporting messages previously received by said management resource computer; and means for aggregating for display or recordation any said reporting messages found by said computer to have matching identifier tokens; thereby correlating all received messages concerning said managed resource.

7. A system as described in claim 6 further comprising:

means for concatenating to said identifier token a message length identifier field and a key identifier subfield from an SNA management services network management vector transport format.

* * * * *